United States Patent
Weiss et al.

(10) Patent No.: US 9,250,432 B2
(45) Date of Patent: Feb. 2, 2016

(54) MICROSCOPE ILLUMINATION SYSTEM, MICROSCOPE AND OBLIQUE INCIDENT ILLUMINATION METHOD

(75) Inventors: Albrecht Weiss, Linden (DE); Arnold Mueller-Rentz, Brechen (DE); Klaus-Peter Schwaab, Braunfels (DE); Stefan Motyka, Braunfels (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1090 days.

(21) Appl. No.: 13/270,267

(22) Filed: Oct. 11, 2011

(65) Prior Publication Data

US 2012/0086795 A1 Apr. 12, 2012

(30) Foreign Application Priority Data

Oct. 12, 2010 (DE) .......................... 10 2010 042 351

(51) Int. Cl.
*G02B 21/08* (2006.01)
*G02B 21/16* (2006.01)

(52) U.S. Cl.
CPC .............. *G02B 21/082* (2013.01); *G02B 21/16* (2013.01)

(58) Field of Classification Search
CPC .................................................... G02B 21/082
See application file for complete search history.

(56) References Cited

U.S. PATENT DOCUMENTS

| | | | | |
|---|---|---|---|---|
| 1,503,800 | A | * 8/1924 | Ott | 359/234 |
| 1,784,425 | A | * 12/1930 | George | 359/799 |
| 4,407,569 | A | 10/1983 | Piller et al. | |
| 4,871,257 | A | * 10/1989 | Suzuki et al. | 356/400 |
| 5,712,698 | A | 1/1998 | Poschenrieder et al. | |
| 5,969,856 | A | * 10/1999 | Greenberg | 359/390 |
| 6,891,671 | B1 | * 5/2005 | Greenberg | 359/388 |
| 7,102,818 | B2 | * 9/2006 | Sander | 359/389 |
| 2007/0247635 | A1 | 10/2007 | Kruger et al. | |

FOREIGN PATENT DOCUMENTS

| | | |
|---|---|---|
| DE | 3527426 C1 | 7/1986 |
| DE | 69704586 T2 | 8/2001 |
| DE | 10110597 A1 | 9/2002 |
| DE | 102006017327 A1 | 10/2007 |
| EP | 0069263 B1 | 1/1983 |

* cited by examiner

*Primary Examiner* — Derek S Chapel
(74) *Attorney, Agent, or Firm* — Leydig, Voit & Mayer, Ltd.

(57) ABSTRACT

A microscope illumination system includes a first light source configured to provide light along an optical axis and an aperture device including an aperture wheel that is rotatable about an axis of rotation. The aperture wheel includes a plurality of apertures of varying size disposed circumferentially on the aperture wheel. The aperture wheel is rotatable so as to dispose each of the apertures in a position that is centered on the optical axis so as to generate an illumination beam path that extends in a centered relationship with respect to the optical axis, and so as to dispose each of the apertures in a position that is off-center from the optical axis and that is within a defined region around the optical axis so as to generate an illumination beam path that extends off-center from the optical axis for oblique incident illumination.

31 Claims, 6 Drawing Sheets

MICROSCOPE ILLUMINATION SYSTEM, MICROSCOPE AND OBLIQUE INCIDENT ILLUMINATION METHOD

CROSS REFERENCE TO RELATED APPLICATIONS

This application claims priority to German Patent Application No. DE 10 2010 042 351.3 filed Oct. 12, 2010, which is hereby incorporated by reference herein in its entirety.

FIELD

The present invention relates to a microscope illumination system including a light source and an aperture device having an aperture for generating an illumination beam path.

BACKGROUND

Oblique incident illumination of objects to be examined is used, for example, in wafer inspection to image surface structures of a specimen with high contrast and three-dimensional appearance using the diffraction effects produced at said surface structures. In German Patent DE 35 27 426 C1, an incident light illuminator for a microscope is described which can be used for this purpose and is adapted to provide oblique incident illumination and which uses an aperture stop of variable size. This patent presents an aperture stop device whose aperture stop can be displaced sideways from the optical axis in both directions. An increase in the distance from the optical axis is associated with an increase in the so-called "incident light angle" at which the axis of the illumination beam path meets the object plane (with respect to the normal to the object plane) after passage through the microscope objective.

However, the design of the incident light illuminator proposed in the above-mentioned document turns out to be mechanically complex and requires training and experience of the user to be successfully used in the field. In addition, as described in the document, the pivoting range may be limited depending on the position within the stand. Finally, as also described in the document, the reproducibility of the direction of light incidence (according to the pivoting movement of the aperture stop device) is limited. The rotation of the adjusting nut required for varying the incident light angle makes it virtually impossible for said angle to be continuously varied during the microscopic examination.

A technically simple and therefore economic alternative to interference microscopy, which is used to advantage for phase objects, is provided by reflected light microscopy with oblique illumination, which is suitable in particular for surface relief observation. To this end, generally, incident light Köhler illumination is used. In this connection, unilateral oblique illumination is obtained by positioning the aperture stop off-center (see document DE 35 27 426 C1 discussed above), while oblique illumination from all sides is obtained by inserting central or annular stops in the plane of the aperture stop.

SUMMARY

In an embodiment, the present invention provides a microscope illumination system including a first light source configured to provide light along an optical axis and an aperture device including an aperture wheel that is rotatable about an axis of rotation. The aperture wheel includes a plurality of apertures of varying size disposed circumferentially on the aperture wheel. The aperture wheel is rotatable so as to dispose each of the apertures in a position that is centered on the optical axis so as to generate an illumination beam path that extends in a centered relationship with respect to the optical axis, and so as to dispose each of the apertures in a position that is off-center from the optical axis and that is within a defined region around the optical axis so as to generate an illumination beam path that extends off-center from the optical axis for oblique incident illumination.

BRIEF DESCRIPTION OF THE DRAWINGS

Further advantages and embodiments of the present invention will become apparent from the following description and the accompanying drawings.

It will be understood that the aforementioned features and those described below can be used not only in the specified combinations, but also in other combinations or alone without departing from the scope of the present invention.

The present invention is schematically illustrated in the drawings using an exemplary embodiment, and will be described below in detail with reference to the drawings.

FIG. 6 is a view similar to those of FIGS. 4 and 5, where unilateral oblique incident illumination is from a direction of light incidence opposite to that of FIG. 5.

DETAILED DESCRIPTION

In an embodiment, the present invention provides a microscope illumination system which provides a technically simple, easy-to-use and reproducible way of providing oblique incident illumination with variable aperture size and variable incident light angle. In another embodiment, the present invention provides a corresponding microscope and a method for incident light microscopy with oblique illumination.

In accordance with an embodiment of the present invention, the aperture device includes an aperture wheel or disc which is rotatable about an axis of rotation and in which a plurality of apertures of different size are formed in a circumferential direction. By rotating the aperture wheel, each of these apertures can be positioned centrally on the optical axis or off-center from the optical axis within a defined region around the same. Of course, this requires that the axis of rotation of the aperture wheel be offset from the optical axis. Unless otherwise specified, and without limiting generality, the illumination is assumed to be a vertical illumination, where the illumination beam is directed through a beam splitter and the microscope objective onto the object to be examined. The central illumination beam path provides axial incident bright-field illumination, while an off-center illumination beam path results in angular incident illumination from one side, which is also referred to as "oblique illumination".

In order to clarify the terms "direction of light incidence" and "incident light angle" used in this application, reference is made to the known spherical coordinate system and its spherical coordinates. The incident light angle; i.e., the angle between the normal to the object plane and the direction of incidence of the illumination beam corresponds to the polar angle, while the direction of light incidence corresponds to the azimuth angle in the spherical coordinate system.

In an initial position, a particular aperture shall be in a centered position with respect to the optical axis of the microscope illumination system. Starting from this position, the aperture can be moved to an off-center position relative to the optical axis by rotating the aperture wheel clockwise or counterclockwise about its axis of rotation. In this process, first, the incident light angle changes and, because of the circular path traced by the aperture during movement of the aperture wheel, the direction of light incidence changes as well. However, the latter changes only to a small degree, because for slight displacements from the optical axis, the circular path can be approximated by a straight line, and especially so in the case of large distances between the optical axis and the axis of rotation of the aperture wheel.

Due to the fact that the aperture wheel has formed therein a plurality of apertures of different size which are arranged in a circumferential direction, it is possible to easily switch between the predetermined aperture sizes by positioning the aperture wheel accordingly.

Due to the capability of reproducibly adjusting each of the apertures to a defined position, an embodiment of the present invention enables, in a technically simple and easy-to-use manner, easily reproducible variation in particular of the incident light angle on both sides of the optical axis, while at the same time allowing use of different aperture sizes.

The "defined region around the optical axis", within which a particular aperture may be positioned off-center from the optical axis, is, in principle, delimited by the spacing between the apertures in the circumferential direction and also by the positions of the respective apertures relative to the edge of the aperture wheel. However, in practice, said limitation is mainly imposed by the diameter of the illumination beam created by the light source and the illumination optics upstream of the aperture. A fixed aperture stop disposed centrally with respect to the optical axis and before, in particular immediately before, the aperture wheel allows such a region to be fixedly defined around the optical axis. In this context, "disposed immediately before the aperture wheel" means that the fixed aperture stop is located adjacent to the aperture wheel in a direction toward the light source. There should be no other optically active elements between the fixed aperture stop and the aperture wheel.

In order to enable, to the extent possible, infinitely variable rotation of the aperture wheel, it is convenient to drive the aperture wheel using a stepper motor. The drive may also be provided by other motors, such as DC motors or magnetic drives. In order to bring the motor and the aperture wheel into an operative position, it is possible to install a gear mechanism, a belt drive, a toothed ring, or the like. Given suitable control, the aperture wheel may alternatively be mounted directly on the motor shaft. Stepper motors operating with minimal step size allow substantially continuous rotation of the aperture wheel. In particular, the use of a stepper motor allows reliable reproduction of a particular setting of the oblique incident illumination, in particular an incident light angle that depends on a particular object.

Advantageously, the axis of rotation of the aperture wheel is disposed parallel to the optical axis in the microscope illumination system and in such a way that the connecting line 17 between the intersection points of the axis of rotation and the optical axis with the aperture wheel forms an angle of substantially 45 degrees with the horizontal. The term "substantially" is understood to mean an accuracy of about 10 degrees, so that said angle should be in a range from 35 degrees to 55 degrees. The term "horizontal" is understood in practice to be the horizontal line through the optical axis of the illumination beam path.

When imposing a Cartesian coordinate system onto the aperture wheel such that its origin coincides with the axis of rotation of the aperture wheel, with the x-axis representing the horizontal and the y-axis representing the vertical, the above-described advantageous arrangement of the axis of rotation relative to the optical axis results in that the selected aperture is moved along a circular arc within the fixed aperture stop (or, more generally, within the defined region around the optical axis) at an angle of about 45 degrees with respect to the x- and y-axes in response to rotation of the aperture wheel. Given the dimensions of the fixed aperture stop in practical applications, the aforesaid circular arc can be adequately approximated by a straight line. When such an illumination beam is directed through a microscope objective onto the object plane to provide incident illumination according to the principles of Köhler illumination, it is possible to obtain an oblique incident illumination in the object plane (as referred to the corresponding x'-y' coordinate system), where the direction of light incidence (azimuth angle) is about 45 degrees, and the incident light angle is adjustable by moving the aperture away from the optical axis (by rotating the aperture wheel about the axis of rotation).

In this manner, sample surface structures extending in a north-south direction (parallel to the x'-axis) and structures extending in an east-west direction (y'-axis) can be effectively visualized simultaneously. These structures may be, for example, structures on wafers, microelectronic components, solar panels, etc., and may be examined either when the components are finished or during manufacture. If, for example, an aperture is movable only in a vertical direction with respect to the optical axis; i.e., in a north-south direction according to the aforementioned Cartesian coordinate system in the aperture wheel, then, in a Köhler-type incident microscope illumination system, which will be described further below, this results in a variation of the incident light angle in a horizontal direction with respect to the object plane (i.e., in an east-west direction in the corresponding Cartesian coordinate system of the object plane). Using a variable oblique incident illumination of this kind, it is indeed possible to effectively visualize surface structures of the specimen which extend in a north-south direction, but in particular those structures which extend in an east-west direction; i.e., parallel to the displacement direction, cannot be seen any better after varying the incident light angle. In contrast, the proposed 45° oblique incident illumination enables effective visualization of both structures having a north-south orientation and structures having an east-west orientation. In particular, there is no need to rotate the microscope stage by, for example, 45 degrees in order to better visualize such structures. Such rotary stages are expensive and, in addition, would only allow for poor reproducibility.

In another embodiment of the present invention, it may be advantageous for the axis of rotation of the aperture wheel to be movable perpendicularly to the optical axis in at least one direction. To this end, for example, the above-mentioned stepper motor, which is capable of rotating the aperture wheel about the axis of rotation, may be moved within the x-y coordinate system of the aperture wheel, for example in the x-and/or y-directions. In this manner, in addition to 45° oblique illumination, it would be possible to perform a displacement in the north-south direction and/or the east-west direction.

It has also proved to be particularly advantageous that the contrast and resolution of the oblique incident illumination are increased during illumination in the ultraviolet region of the spectrum ("oblique UV"). In accordance with the law of physics, illumination with the short wavelengths of the UV spectrum results in a higher resolution than illumination in the visible region. A suitable light source is in particular an LED emitting light having a wavelength of 365 nm (referred to as "i-line"). The ultraviolet spectral region ranges from 400 to about 185 nm UV illumination provides higher resolution already in axial incident bright-field illumination, and when changing to oblique incident illumination, it additionally allows the object structures to be represented with a three-dimensional appearance. Using oblique UV illumination, components with larger topographies can be inspected with increased resolution. Fine scratches on bare wafers, for example, or the degree of photoresist erosion on semiconductor structures, can be visualized in this manner.

A UV objective specifically matched for this oblique UV illumination, in conjunction with a UV beam splitter and a UV sensitive camera, enables the user to visualize the UV image captured by the camera on the monitor of a PC, for example, and to optimize it. However, there are also UV objectives (such as are available from the Applicant), which are suitable for classical methods, such as incident bright-field illumination, incident dark-field illumination, and DIC illumination, and can also be used to perform the same methods with i-line illumination (i.e., UV light at 365 nm). Further, there are beam splitters which are, in fact, "UV-optimized", but are also suitable for the respective methods in visible light.

An embodiment of the present invention also provides a microscope illumination system having a light source and an aperture device for generating a central illumination beam path on the one hand and, alternatively, an off-center illumination beam path on the other, where the spectral regions of the illumination light can be varied in a simple manner. A variety of lamp housings and different types of lamps as light sources are usually available for use as light sources in known microscope illumination systems. Filters are used to cut out specific spectral regions. For example, heretofore, switching from the visual spectrum to the ultraviolet spectrum has always involved insertion or removal of filters, either manually or by motor means. Such switching between spectral regions may be accomplished in a technically simple manner by providing the microscope illumination system with two light sources having different spectra or different wavelength ranges. The illumination spectrum can then be changed simply by switching between the light sources without having to use filters. Of course, this requires that the light sources and the paths of light produced by them are suitably coupled into the illumination beam path of the microscope illumination system. This can be easily achieved using a dichromatic beam splitter via which the two light sources can be coupled into the illumination beam path. Of course, this aspect is also applicable to more than two light sources.

The light sources may take the form of LEDs, which are controllable, in particular, in their output power. Thus, the different LEDs can be switched on alternately, which allows easy switching between, for example, the visual spectrum and the ultraviolet spectrum (or a spectrum including at least part of the ultraviolet wavelength range). Power control may also be implemented such that specific portions of different spectra can be simultaneously coupled into the illumination beam path with specific intensities.

In order to provide incident illumination according to the Köhler principle, the aperture wheel may be located in a plane conjugate to the light source of the microscope illumination system. In this case, the light source is imaged into the aperture wheel; i.e., into the fixed aperture stop located immediately before the aperture wheel. In addition, the aperture wheel of the microscope illumination system is located in a plane conjugate to the entrance pupil of the microscope objective. This enables uniform illumination of the object plane.

In an embodiment, the present invention also provides a microscope having a microscope illumination system that includes at least one light source, as has been described hereinabove, and further having at least one microscope objective. In practice, there is typically provided a nosepiece carrying a plurality of microscope objectives from which to select. Further, the microscope includes the usual components, such as a tube optical system, an eyepiece and/or a camera. Unless otherwise specified, these components are hereinafter together referred to as "imaging optics". In such a microscope, incident light illumination can be achieved by the illumination beam of the microscope illumination system being coupled into the optical path of the microscope via a beam splitter preferably disposed between the microscope objective and the imaging optics, so that the objective focuses the light beam onto the specimen. From the object, the beam is passed through the objective, the beam splitter and a tube optical system along the imaging beam path and is imaged onto a camera.

The use of an aperture wheel having different apertures has the advantage of allowing for much smaller aperture diameters than would be possible when using, for example, an iris diaphragm. While iris diaphragms can be closed to a diameter of about 1 mm only, the apertures in the aperture wheel can have even smaller diameters. For example, a 150x/0.90 objective has a pupil diameter of 2.4 mm. When the aperture stop is imaged with a factor of 2 into the pupil of the objective, an aperture diameter of only 2.4 mm/2=1.2 mm is needed for the full illumination aperture of this objective. In the case of this objective, if one wishes to stop down on the illumination side, the aperture diameter must be significantly smaller than 1.2 mm, preferably smaller than 1 mm, which, however, is not possible using conventional iris diaphragms. If, in addition, an off-center illumination beam whose diameter is located completely outside of the optical axis is to be produced in accordance with an embodiment of the present invention, the aperture diameter of the aforesaid objective must be smaller than or equal to 0.6 mm, which is also not possible using conventional iris diaphragms.

In an aforesaid microscope having a plurality of objectives, it is advantageous if each microscope objective is associated, or capable of being associated, with an aperture on the aperture wheel of the microscope illumination system. Depending on the microscope objective used, a specific aperture of suitable diameter can be selected for the incident illumination. This association may be done by the user or at the factory, for example by controlling the respective components accordingly. In another embodiment, such a microscope has a plurality of microscope objectives which are associated, or capable of being associated, with an aperture of specific size on the aperture wheel of the microscope illumination system. Alternatively, at least one of the microscope objectives is associated, or capable of being associated, with several apertures. Preferably, the association is such that when changing an objective, the associated aperture, or one of the associated apertures, is rotated to the target position; i.e., onto the optical axis, by rotating the aperture wheel accordingly.

Distributing apertures of different size along the circumference of the aperture wheel, advantageously in the order of increasing diameter, provides the same effect as that obtained by opening or closing an iris diaphragm in the aperture plane. However, the reproducibility offered by this method is much higher than that provided by an iris diaphragm. Depending on the differences in diameter of adjacent openings, it is also conceivable to associate two or more apertures with a particular microscope objective. The size of the aperture determines the size of the illumination aperture. As is generally known, optical resolution decreases and contrast increases with decreasing illumination aperture size. Large openings result in greater illumination apertures with higher resolution and lower contrast.

In order for the microscopically obtained image to be optimized in terms of resolution and contrast, it is particularly advantageous to provide a control unit which is operatively connected to a drive unit for rotating the aperture wheel of the microscope illumination system and optionally also to the at least one light source of the microscope illumination system. The control unit may be designed in such a way that, depending on whether the illumination provided is in the UV region or in the visual region, the corresponding microscope objective and the aperture associated therewith will be moved into their respective initial or target positions. For example, depending on the selected spectrum of the light source, the associated aperture may also be positioned to provide an illumination beam path which is displaced off-center to a greater or lesser degree.

It is advantageous, in particular, if in order to analyze a camera image, the control unit is operatively connected to a camera which produces a microscopic image of the object in the form of a camera image. The camera image can be analyzed with respect to resolution and/or contrast using methods described further below. By varying one or more of the adjustable parameters (spectrum of the light source, intensity of illumination, diameter of the aperture, incident light angle and direction of light incidence, as well as the type of microscope objective) using the control unit, the camera image can be optimized. The corresponding parameters found can later be reselected accordingly for examinations of the same type, which provides high reproducibility.

For example, the spectrum or wavelength range of the illumination and the intensity of illumination can be adjusted in a defined manner through the control of the at least one light source. Controlling the drive unit of the aperture wheel allows defined adjustment of, for example, the diameter of the aperture, the incident light angle (distance of the aperture from the optical axis) and the direction of light incidence (position of the aperture with respect to the optical axis for the same distance).

The camera image may be optimized in various ways: On the one hand, the particular camera image displayed can be optimized by varying one or more of the adjustable parameters mentioned. On the other hand, a series of camera images may be captured using different settings (variation of said parameters), and an optimal image may be selected from said series of camera images, either automatically or by a user. The settings associated with the optimal camera image may be selected for additional camera images to be taken of this object or similar objects.

The process of optimizing the camera image through the corresponding adjustment of the parameters mentioned is preferably carried out automatically using an image-analyzing device which forms part of the control unit. This self-optimization of the camera image is then carried out in a manner similar to a closed-loop control system, where the adjustable parameters mentioned are the input variables, while one or more analysis criteria for the camera image; i.e., at least resolution and/or contrast, are the resulting output variables.

Finally, with regard to the aforedescribed illumination in the UV region of the spectrum ("oblique UV"), it is advantageous for said control unit to be designed to automatically, or in response to a user input, cause a light source having a spectrum in the ultraviolet wavelength range to be activated in the illumination beam path, and to cause a user-selectable aperture (or, alternatively, a fixed predetermined aperture) to be reproducibly adjusted to a position relative to the optical axis by means of the drive unit of the aperture wheel. It may also be useful to successively adjust various defined positions from which to select the best position.

In an embodiment, the present invention also provides a method for oblique incident illumination of objects to be microscopically examined. Many aspects of this method have been described earlier herein in connection with the microscope illumination system and the microscope. Accordingly, the above disclosure explicitly also relates to the method. The method for oblique incident illumination of objects to be microscopically examined has the basic feature that an aperture wheel, which is rotatable about an axis of rotation and in which a plurality of apertures of different size are formed in a circumferential direction, is disposed in relation to the optical axis of a microscope illumination system in such a manner that each aperture can be positioned centrally on the optical axis in an initial position by rotating the aperture wheel and, by further rotation, such aperture can be positioned off-center from the optical axis within a defined region around the optical axis. With regard to the advantages of this method, reference is explicitly made to the explanations given above in connection with the microscope illumination system and the microscope according to an embodiment of the present invention.

It is advantageous to use a light source having a spectrum in the ultraviolet wavelength range as the light source of the microscope illumination system. In particular, it is advantageous to use (at least) two light sources in the ultraviolet and visual regions, respectively, which are each coupled into the beam path of the microscope illumination system via a dichromatic beam splitter. These embodiments have been described in detail earlier herein. Therefore, a description thereof will not be repeated here to avoid redundancy. The same applies to the embodiment according to which rotation of the aperture wheel is accomplished using a drive motor whose shaft coincides with the axis of rotation of the aperture wheel. The term "coincide" is intended to include a connection of the axis of rotation and the shaft, or a single piece design.

In an embodiment of a method of the present invention in which the illumination beam propagating centrally or off-center in relation to the optical axis is directed through a microscope objective onto the object to be examined, it is advantageous if, depending on the microscope objective selected, an aperture associated therewith is moved into said initial position in which it is centered with respect to the optical axis. The association between the aperture and the microscope objective may be preprogrammed at the factory and be carried out, for example, by a control unit. Alternatively, the association may be defined by the user. This offers the user another way to define the initial position of the aperture wheel that is to be used as a starting position for adjusting the appropriate incident light angle.

The method according to an embodiment of the present invention can be used, in particular, for optimizing a camera image of an object being examined microscopically. To this end, the camera image is analyzed with respect to at least resolution and/or contrast. This analysis can be performed either using known image processing methods or using the here proposed analysis techniques, which will be described further below. The three-dimensional appearance of the image can be optimized by rotating the aperture wheel within the defined region around the optical axis or, in other words, by varying the incident light angle.

An alternative or additional way of optimizing the camera image is to select a suitable aperture and/or a suitable microscope objective. For example, for a given microscope objective, stopping down or up can be accomplished by selecting a smaller or larger aperture, respectively, starting from the aperture that is associated with this microscope objective. Compared to the larger illumination aperture, the smaller illumination aperture results in lower resolution but higher contrast, while the larger illumination aperture leads to increased resolution but lower contrast, as compared to the smaller illumination aperture. The appropriate microscope objective is selected according to desired magnification of the object. When changing from illumination with visual light to UV light, it may also be necessary to change the objective.

Another alternative or additional way of optimizing the camera image is by the selection of the light source of the microscope illumination system. As described earlier herein, observation in the visual region of the spectrum may be sufficient and advantageous, but for higher resolutions, it is convenient to switch to UV illumination.

Possible methods for optimizing the camera image have been described earlier herein in connection with the microscope of the present invention and its control unit. In order to avoid repetitions, the explanations given there are intended to support also the method of the present invention with respect to any possible forms of camera image optimization.

The optimization of the camera image is accomplished in particular by capturing various camera images of a selected object region using different ones of the settings that can be changed on the microscope and/or on the microscope illumination system; i.e., in particular, the just described options of changing the incident light angle, the aperture, the microscope objective and/or the light source, and by generating an intensity profile of a representative area for each of these camera images. Such an intensity profile is formed in particular by the grayscale values of an image line, plotted over the corresponding image line, for example as the number of pixels. Depending on the type of object, it is also possible to create a three-dimensional intensity profile. In a subsequent step, analysis criteria are defined for the intensity profiles obtained. Examples of particularly suitable analysis criteria are the number and slope of flanks of an intensity profile, or the number of extreme values in an intensity profile. While the number of flanks provides information about the contrast of the image area observed, the number of extreme values (maxima and minima of the intensity profile or of the grayscale values) gives information about the resolution within the image area observed. Instead of performing the analysis based on the intensity profile, it is also possible to use the first mathematical derivative thereof, in which flanks of the intensity profile can be identified by extreme values and extreme values of the intensity profile can be identified by zero crossings. The intensity profiles of the individual camera images can then be compared with respect to the analysis criteria, and the optimal intensity profile and the associated camera image can be determined based on the comparison. This determination is made according to the particular task to be performed. This task may be to generate an image with highest possible resolution, or an image which provides an optimum compromise between high resolution and high contrast.

Another way of optimizing the camera image is to generate different camera images using the stored parameters for settings that can be changed on the microscope and/or on the microscope illumination system, and to let the user select the optimal camera image. In this case, the camera images would be visually assessed by the user. Again, the parameters stored include the incident light angle (i.e., rotation of the aperture wheel with a given aperture), direction of light incidence (i.e., direction of rotation of the aperture wheel), illumination aperture (i.e., the aperture located in the operating position), illumination spectrum (i.e., the active light source with a predetermined spectral range), intensity of the light source, and the type of microscope objective.

Figure 1:
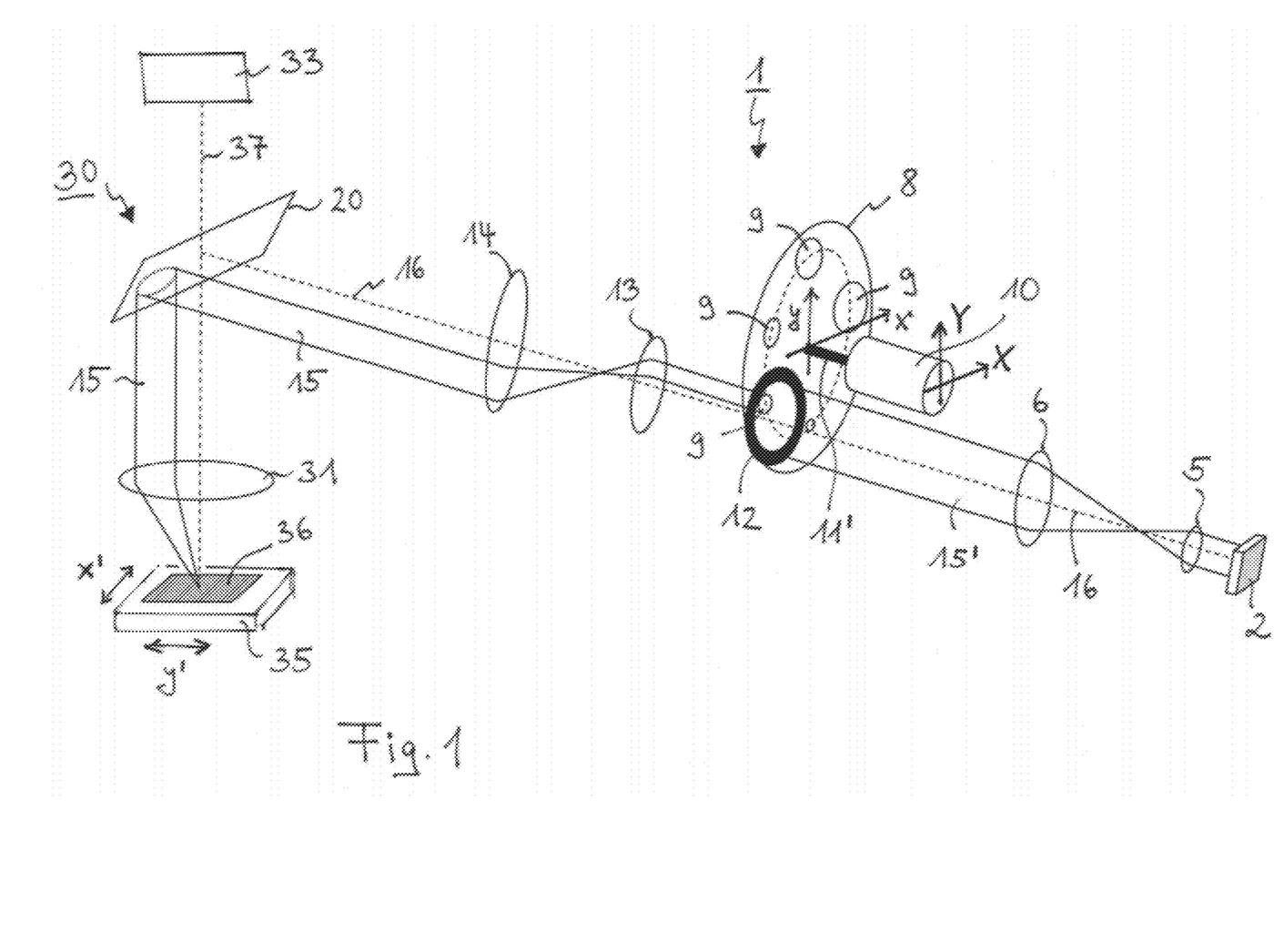
FIG. 1 is a schematic perspective view of the basic design of an embodiment of the microscope illumination system of the present invention and the associated microscope.

FIG. 1 shows a microscope illumination system 1 in a schematic perspective view. Microscope illumination system 1 includes a light source 2 and two lenses 5 and 6 located downstream of light source 2 and positioned on optical axis 16 of microscope illumination system 1. Lenses 5 and 6, which may also be referred to as illumination optics, are used to image light source 2 into the aperture plane, in which is disposed a fixed aperture stop 12. In a plane immediately behind the fixed aperture stop, there is located aperture wheel 8 having apertures 9 arranged in a circumferential direction. Aperture wheel 8 is rotatable about an axis of rotation 11 which, in this case, coincides with shaft 11' of a stepper motor 10. Alternative solutions are also possible in which other drives are used in place of a stepper motor, such as, for example, a DC motor or a magnetic drive. The mechanical coupling may alternatively be accomplished via gear mechanisms, gear wheels, toothed belts, etc. As is apparent from FIG. 1, rotation of aperture wheel 8 about axis of rotation 11 causes apertures 9 to move through the region defined by fixed aperture stop 12. In this manner, the illumination beam 15' before fixed aperture stop 12 is converted to an illumination beam 15 behind aperture 9 by masking.

Also positioned on optical axis 16 of microscope illumination system 1 are lenses 13 and 14, which relay illumination beam 15 to beam splitter 20. Beam splitter 20 forms part of microscope illumination system 1 on the one hand, where it functions to deflect the illumination beam 15 onto object 36 in an object plane and, on the other hand, beam splitter 20 is part of microscope 30, where it allows a portion of the imaging beam (not shown) coming from object 36 to pass therethrough toward imaging optics 33.

FIG. 1 shows, very schematically, a microscope 30 including, as essential components, an objective 31 and imaging optics 33. Imaging optics 33 include the usual components, such as a tube optical system, an eyepiece and/or a camera. Since the details of these components are not significant here, reference is made to the prior art for the design and function of these microscope components. Microscope 30 further includes an x'-y' microscope stage 35, on which an object 36 to be microscopically examined is supported in an object plane. In the present exemplary embodiment, this object is a wafer which is to be inspected for scratches or defective structures, for example. A microscopic image of the observed region of object 36 is generated in a known manner by means of objective 31 and imaging optics 33. This microscopic image may either be viewed by a user through an eyepiece or captured by a camera and displayed on a monitor (not shown). As for the latter option, reference is made to the embodiment shown in FIG. 2.

The following describes the operation of the design shown in FIG. 1. Optically speaking, the image-forming beam path illustrated in FIG. 1 provides Köhler illumination with vertically incident light (the illumination beam is coupled in through the microscope objective onto the object plane). To this end, aperture wheel 8 is located in a plane conjugate to light source 2. Moreover, aperture wheel 8 is located in a plane conjugate to the entrance pupil of microscope objective 31. This enables uniform illumination of the object plane, and thus of the specimen area being observed. Light source 2 is imaged into the aperture stop plane through the imaging optics formed by lenses 5 and 6. A fixed aperture stop 12 disposed centrally with respect to optical axis 16 defines the maximum diameter of the aperture. An aperture 9 located within the region defined by fixed aperture stop 12 converts illumination beam 15' to an illumination beam 15 which may be centered or off-center. Central bright field illumination (also referred to as axial incident bright-field illumination) can be provided by positioning any of the apertures 9 of aperture wheel 8 exactly on optical axis 16. The size of aperture 9 determines the size of the illumination aperture. When changing from central to oblique illumination, aperture 9 is displaced from its initial centered position with respect to optical axis 16. In the exemplary embodiment shown, this movement is obtained by rotating aperture wheel 8 about its axis of rotation 11, which is also the axis or shaft 11' of stepper motor 10. Depending on the direction of rotation of stepper motor 10, aperture 9 is moved angularly upward or downward to the desired target position.

In FIG. 1, it can be seen that axis of rotation 11 of aperture wheel 8 extends parallel to optical axis 16 of microscope illumination system 1 and is "offset 45 degrees" from this optical axis 16. More precisely, this means that the connecting line 17 between the intersection points of optical axis 16 and axis of rotation 11 with aperture wheel 8 forms an angle of 45 degrees with the horizontal of the illumination beam path, and thus with the x-axis of the illustrated coordinate system (see also FIG. 3). An angle of 45 degrees is also formed with the y-axis shown in the drawing. Of course, the aforementioned 45-degree angle does not have to be an angle of exactly 45 degrees. Deviations are possible and may even be desired, depending on the particular structure of object 36 that is to be imaged. However, since object 36 is usually disposed on microscope stage 35 in such a way that the structures present on object 36 extend in the x' and/or y' directions, a 45-degree offset arrangement is convenient because it results in a direction of light incidence which in turn forms an angle of 45 degrees with each of the x' and y' axes of the coordinate system in the object plane. Thus, structures extending in both the x'-direction (N-S direction) and the y'-direction (E-W direction) can equally well be imaged with a three-dimensional appearance.

Rotation of aperture wheel 8 causes aperture 9 to move through the region defined by fixed aperture stop 12 along a circular arc whose radius corresponds to the distance of optical axis 16 from axis of rotation 11. This is explained in greater detail with reference to FIG. 3. As a result of this movement of aperture 9, the incident light angle on object 36 increases with increasing distance from optical axis 16. The direction of light incidence remains approximately at an azimuth angle of 45 degrees since the aforesaid circular arc can be approximated to a good accuracy by a straight line. This line extends at an angle of 45 degrees to the horizontal, and thus to the x-axis.

Figure 3:
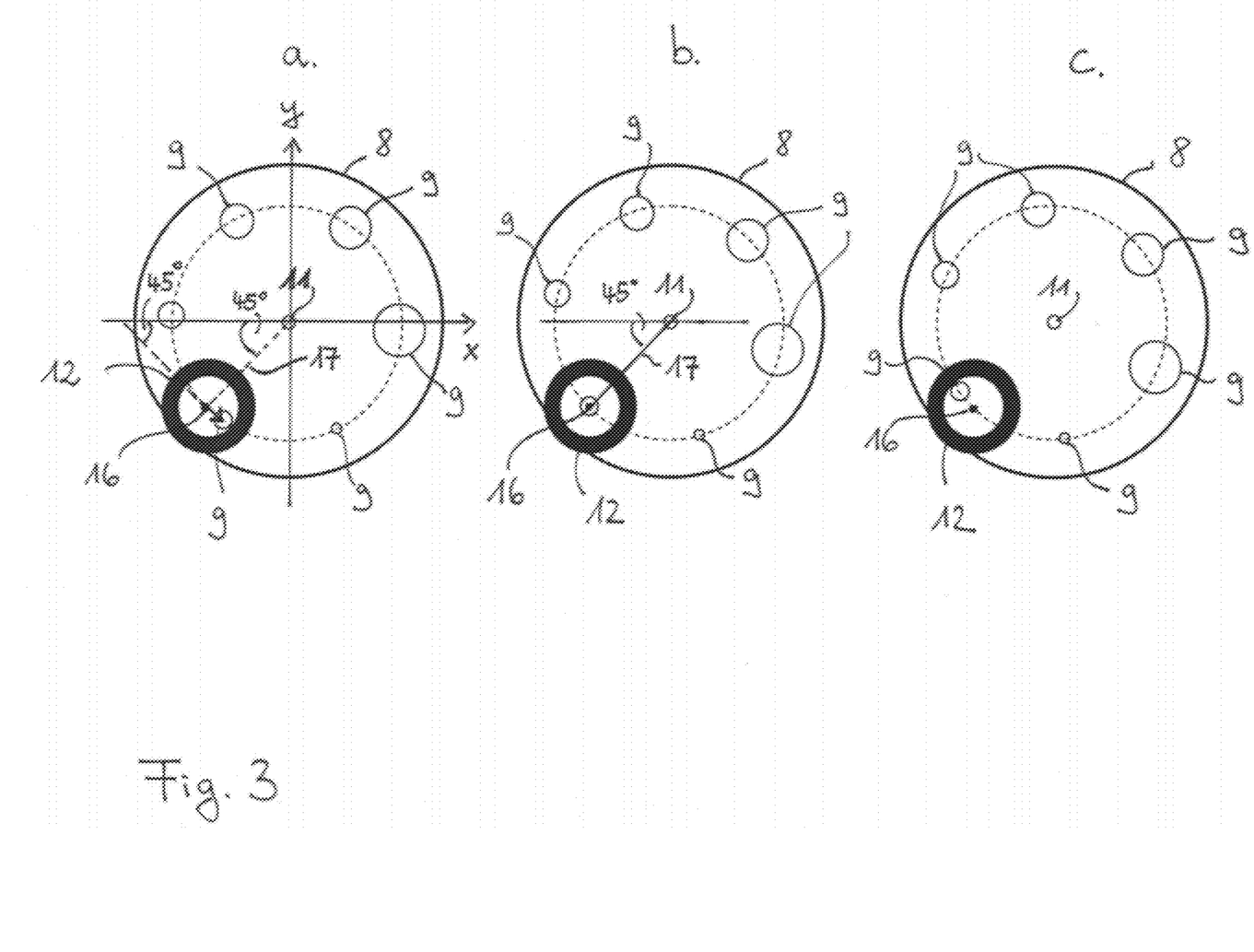
FIG. 3 shows an embodiment of an aperture wheel of a microscope illumination system in three different rotational positions.

In another embodiment, aperture wheel 8 can be moved as a whole in the aperture stop plane. One way to achieve this is by supporting stepper motor 10 itself in such a way that it is movable in the X-Y plane. Movement of stepper motor 10 in the Y-direction causes illumination beam 15 to be displaced in the y'-direction in the object plane. Conversely, movement of stepper motor 10 in the X-direction causes illumination beam 15 to be displaced in the x'-direction in the object plane.

Due to the short wavelength of such UV sources, the use of a light source 2 with emission in the UV spectrum (for example, an LED emitting i-line (365 nm) radiation) makes it possible to achieve higher resolution than with illumination in the visual region. At the same time, the described generation of an off-center illumination beam 15' allows structures on object 36 to be represented with a three-dimensional appearance. This makes it possible, for example, to visualize fine scratches on bare wafers or the degree of photoresist erosion on semiconductor structures. The angular illumination with UV light will also be referred to as "oblique UV".

Figure 2:
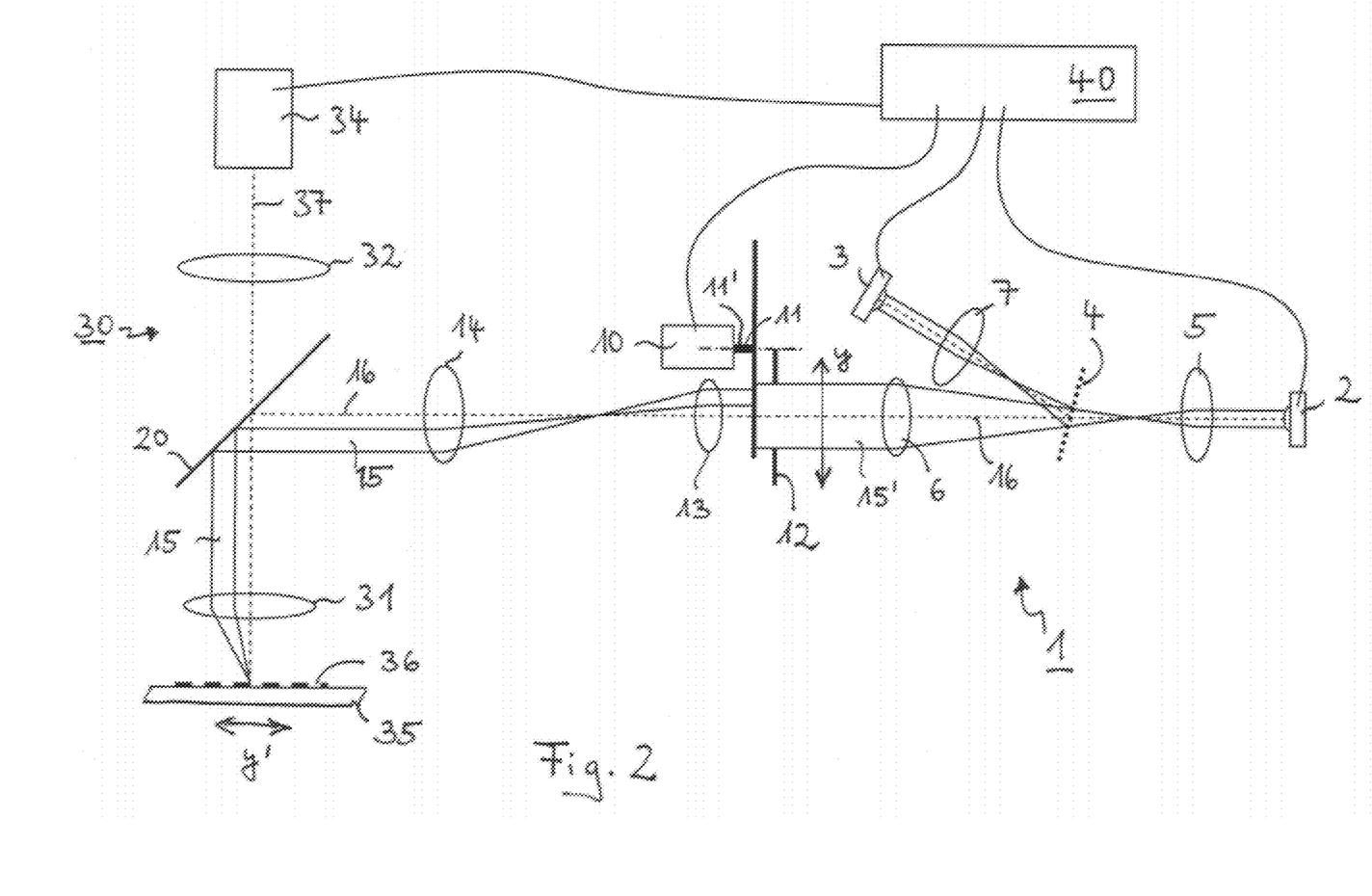
FIG. 2 is a schematic side view of another embodiment of the design of FIG. 1, including a second light source and a control unit for optimizing the camera image.

FIG. 2 illustrates a configuration which allows easy switching between two light sources. Moreover, FIG. 2 depicts an arrangement for optimizing a camera image containing a microscopic representation of structures on an object 36. FIG. 2 basically shows the same elements as FIG. 1 and uses the same reference numerals for like elements. Therefore, a description of elements known from FIG. 1 will not be repeated here. Only the additional elements will be discussed below.

In addition to light source 2, microscope illumination system 1 includes a further light source 3, which is coupled into the path of illumination beam 15' via lens 7 and a dichromatic splitter 4. The other lens 6 is unchanged with respect to FIG. 1. Thus, lenses 5 and 6 form the illumination optics for light source 2, while lenses 7 and 6 form the illumination optics for light source 3. Also shown in FIG. 2 are elements of imaging optics 33 of microscope 30, which are known from FIG. 1. These elements are tube optical system 32 and a camera 34 placed downstream of tube optical system 32. Camera 34 captures the microscopic image electronically. The camera image may, on the one hand, be visually displayed and, on the other hand, be electronically processed and analyzed using image processing methods. The illustrated configuration of a microscope 30 including an objective 31, a tube optical system 32 and a camera 34 is, per se, known to those skilled in the art.

In FIG. 2, there is also shown a control unit 40. Control unit 40 allows the camera image obtained to be optimized both fully automatically and semi-automatically. One way to do this is described below by way of example without limiting the various options discussed in the general description section of this application.

As is apparent in FIG. 2, control unit 40 is connected to both light sources 2 and 3, to stepper motor 10, and to camera 34. It may be convenient to control additional components such as, in particular, an objective turret (not shown) carrying a plurality of objectives from which to select a suitable objective 31. Control unit 40 is connected to light sources 2 and 3 in a manner as to allow said light sources to be operated at least alternately; i.e., to be switched on and off. In a further embodiment, the intensity or output power of light sources 2 and 3 can also be controlled via control unit 40. Control unit 40 is connected to stepper motor 10 in such a manner that by rotating aperture wheel 8, a particular aperture 9 provided on aperture wheel 8 can be moved to an initial position in which aperture 9 is centered with respect to optical axis 16 of microscope illumination system 1. Subsequently, control unit 40 may drive stepper motor 10 to make a fine adjustment, during which aperture 9 is displaced from its initial position to be moved to a defined target position within the region defined by fixed aperture stop 12 (as has been described in detail with reference to FIG. 1). Finally, control unit 40 is connected to camera 34 in such a way that the camera image can be analyzed in control unit 40. This analysis includes at least the criteria of resolution and/or contrast. Of course, control unit 40 can also make certain image capture settings on camera 34.

The assumption is made here that light source 3 emits in the ultraviolet region of the spectrum and that light source 2 emits in the visual region of the spectrum. It is advantageous to use LEDs as light sources 2 and 3. Control unit 40 allows light sources 2 and 3 to be controlled; i.e., to be switched ON and OFF (and, possibly, controlled in their output power) independently of one another. By selecting the appropriate light source, it is possible to account for the desired resolution in the microscopic camera image, which is dependent on the fineness of the structures on object 36 to be examined. Switching between the light sources can be performed easily without interposing or operating filters. The aperture wheel may have six different apertures 9 or, in another embodiment, it may have fourteen (or any other number of) different apertures 9. Apertures 9 have diameters of different size and are arranged on the wheel in a circumferential direction, preferably in ascending order of diameter. In practice, a microscope 30 having an objective turret is used, so that different objectives 31 can be inserted into the imaging beam path of microscope 30. The selection of the objective depends on the desired magnification and other parameters which, in turn, are dependent the structures on object 36 on the one hand, and on the light source used on the other. In the case of UV illumination, a UV-capable objective 31 is advantageously used. A particular objective 31 may be associated with one or more apertures 9. Changing the apertures then has the same effect as the opening or closing of an iris diaphragm in the aperture plane. However, as explained elsewhere herein, this method offers much higher reproducibility than an iris diaphragm, and makes it possible to achieve much smaller aperture diameters than those achievable with an iris diaphragm. Without limiting generality, it will now be assumed that each objective 31 is associated with exactly one aperture 9 on aperture wheel 8. Advantageously, this association is stored by software in control unit 40, so that when the objective is changed, the associated aperture 9 is automatically moved into its initial position in which it is centered with respect to optical axis 16 of microscope illumination system 1. To this end, aperture wheel 8 is suitably rotated about axis of rotation 11 by stepper motor 10. Thus, for example, when switching from one light source 2, 3 to another light source 3, 2, the corresponding objective 31 can be moved onto optical axis 37 of the imaging beam path of microscope 30 by rotation of the objective turret under the control of control unit 40, and at the same time the associated aperture 9 can be moved into its initial position by driving stepper motor 10 accordingly.

Figure 4:
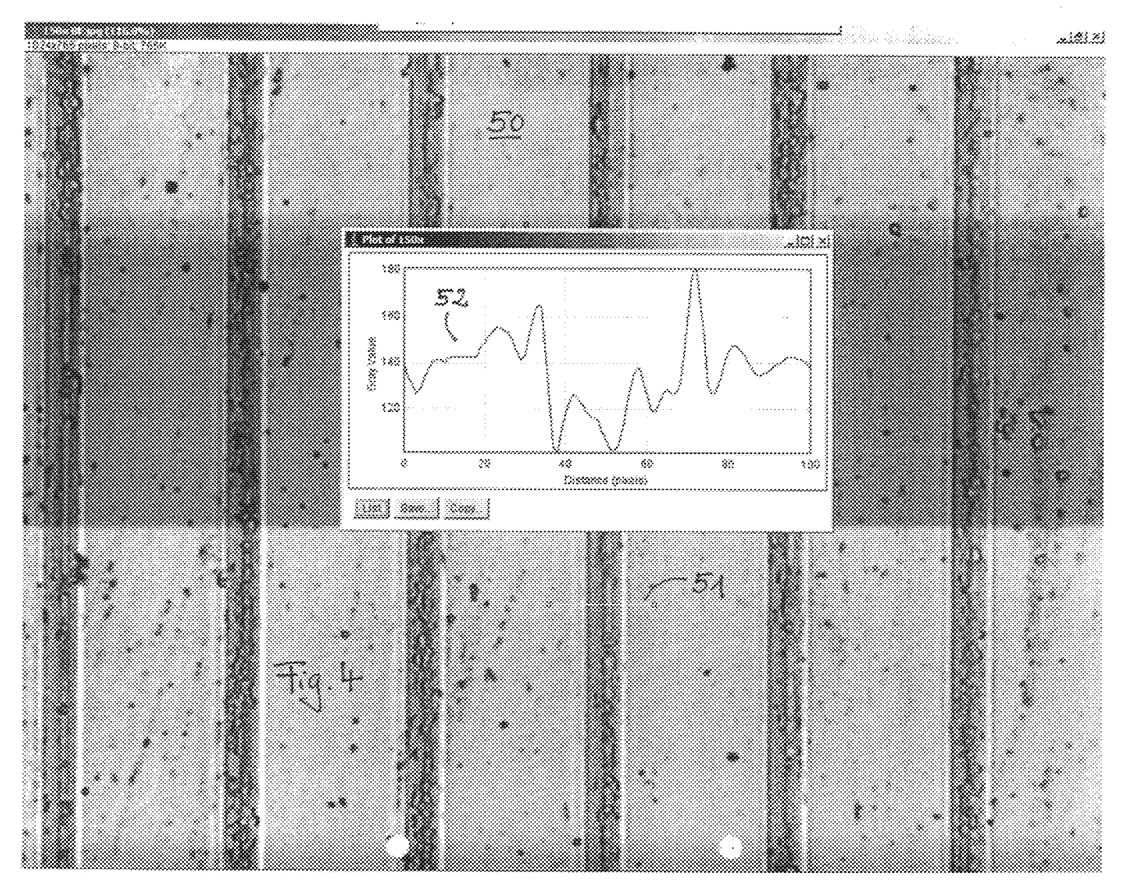
FIG. 4 shows a microscopic image of an object region and the intensity profile of a selected image area, captured while illuminating the object with axially (centrally) incident light.
Figure 5:
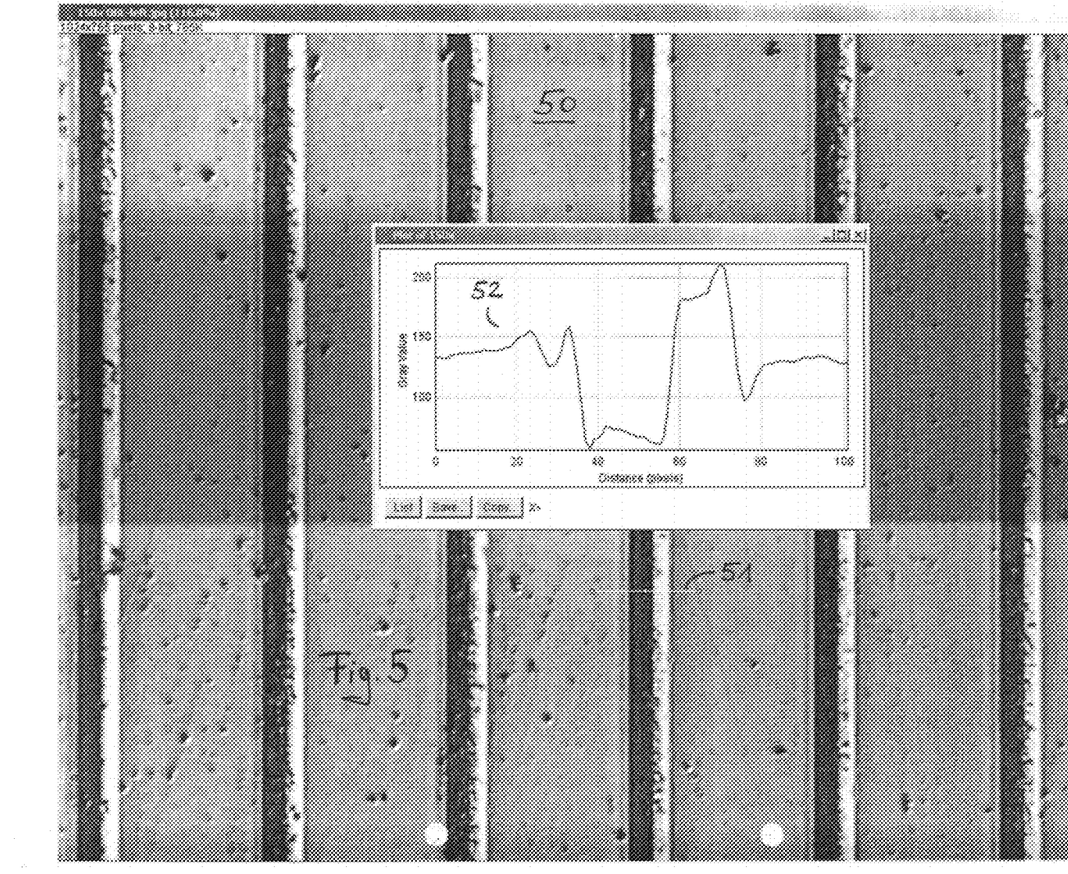
FIG. 5 is a view similar to that of FIG. 4, but where unilateral illumination is provided by light obliquely incident from a first direction of light incidence.
Figure 7:
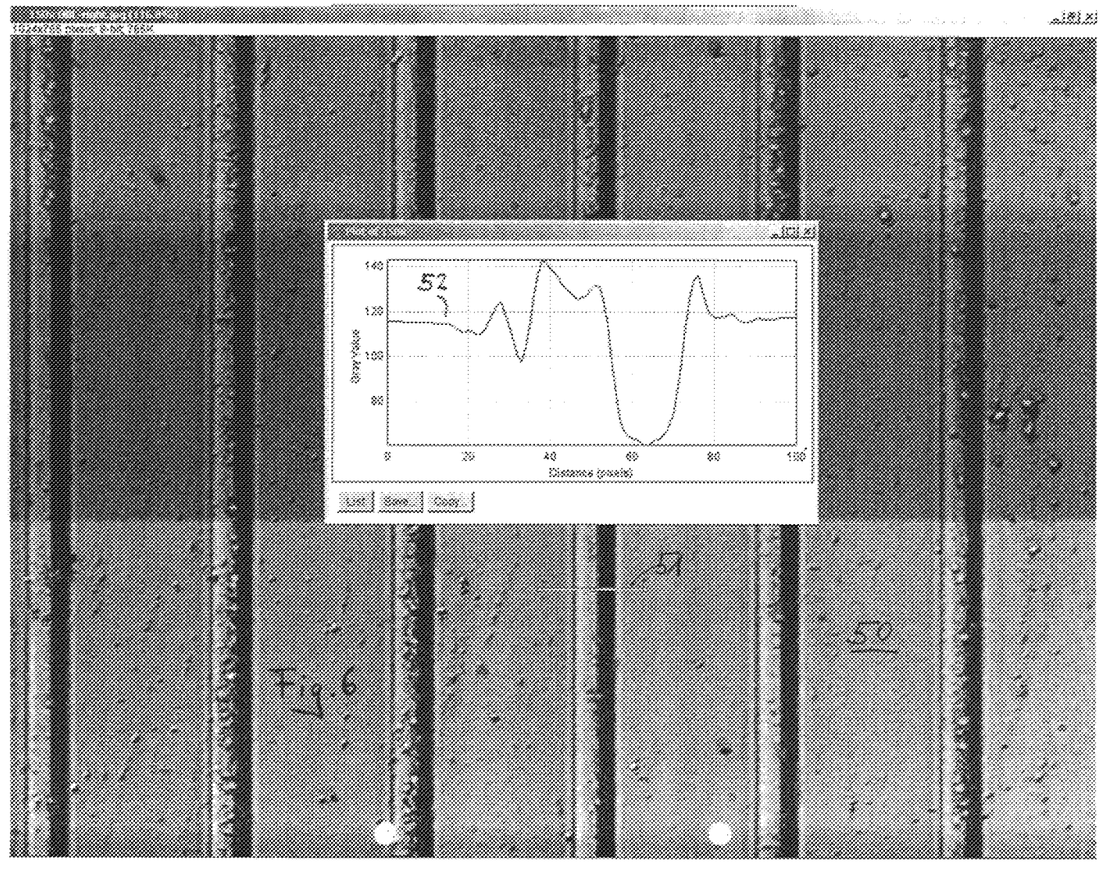

It is then possible to generate a camera image of the microscopically imaged structures on object 36 that are to be examined. For example, initially, an image is captured under axial incident illumination using selected parameters (light source, aperture, objective). An example of such an image is shown in FIG. 4, which shows the structures which extend in a north-south direction and repeat in an east-west direction. This image shows parallel structures of a wafer. In unilateral 45° oblique incident illumination, the incident light angle can be varied by rotating the selected aperture 9 in a direction within the region defined by fixed aperture stop 12 around optical axis 16. FIG. 5 shows an image captured of the same object region (as in FIG. 4) at a certain incident light angle. FIG. 6 shows a image which is similar, but was captured at the opposite incident light angle as compared to FIG. 5 since the aperture wheel was rotated by the same angle in the other direction. The differences in the camera images are already very clearly visible here. Thus, a number of camera images may be captured while varying the incident light angle and the direction of light incidence, and the optimal camera image can be determined in this manner. Generally, the settings associated with the optimal camera image will depend very much on the structure to be imaged.

In addition to varying the incident light angle and the direction of light incidence, it is also possible, of course, to vary other parameters, such the type of objective 31, aperture 9 and light source 2, 3.

Automatic optimization of the camera image may advantageously be accomplished, as illustrated in FIGS. 4 through 6, by generating an intensity profile 52 for a defined area 51 of camera image 50 and superimposing it centrally on the respective camera image 50 in FIGS. 4 through 6. In this case, intensity profile 52 represents the grayscale values across area 51 (pixel distance). Transitions from regions of bright grayscale values to regions of dark grayscale values are marked by steep flanks. Steep flanks are indicative of high contrast, while the number of extreme values (maxima and minima) in an intensity profile 52 is indicative of the resolution in an area 51 being observed. In FIG. 4, the presence of many extreme values indicates high resolution, which is at the expense of image contrast. In comparison, FIG. 5 shows clearly less extreme values, and thus lower resolution, and a few steep flanks, which indicates high contrast. Similar conditions are shown in FIG. 6. While in FIG. 5, the deviations from an average grayscale value (of about 130 on the scale) are relatively large in both directions, FIG. 6 shows small upward deviations and only slightly larger downward deviations from the average grayscale value (of about 120). This in turn indicates that the bright-dark contrast in FIG. 5 is higher than in FIG. 6.

The analysis of intensity profiles 52 for a series of captured camera images 50, as discussed herein, can be performed automatically in a control unit 40. This makes it possible to determine the parameters that lead to an optimized camera image, for example with respect to contrast. After selecting these parameters, it is then possible to examine the entire sample, or a series of samples of the same type.

FIG. 3 shows, in a schematic elevation view, an aperture wheel 8 having a total of six apertures 9. Again, the axis of rotation is denoted by 11. FIG. 3b shows aperture wheel 8 in a position which is used for centered illumination (or axial incident illumination), while FIGS. 3a and 3c show positions which are used for oblique incident illumination. The camera image 50 shown in FIG. 4 can be generated, for example, with aperture wheel 8 in the position shown in FIG. 3b, while the camera images 50 shown in FIGS. 5 and 6 can be generated using the aperture wheel positions shown in FIGS. 3c and 3a, respectively.

The fixed aperture stop is denoted by 12. It cuts out a defined region within which a selected aperture 9 may be moved to vary the incident light angle. Movement beyond this defined region results in complete shading. It is only after further rotation that the next aperture 9 in the circumferential direction enters the region defined by fixed aperture stop 12.

Again, the optical axis of microscope illumination system 1 is denoted by 16. As is clearly apparent from FIG. 3, the connecting line 17 between optical axis 16 and axis of rotation 11 in the plane of FIG. 3 forms an angle of 45 degrees with the x-axis. The circular arc along which aperture 9 is moved during rotation of aperture wheel 8 is drawn as a dashed line. The remaining apertures 9 must be arranged along this dashed line. Fine rotation of the aperture wheel 8 causes the selected aperture 9 to be displaced from its initial position at an angle of also approximately 45° to the x-axis to the extent that this movement along the dashed circular path is approximated by a movement along a corresponding straight line.

While the invention has been particularly shown and described with reference to preferred embodiments thereof it will be understood by those skilled in the art that various changes in form and details may be made therein without departing from the spirit and scope of the invention.

LIST OF REFERENCE NUMERALS 1 microscope illumination system
2 light source
3 light source
4 dichromatic splitter
5 lens
6 lens
7 lens
8 aperture wheel
9 aperture
10 drive unit, drive motor, stepper motor
11 axis of rotation
11' shaft
12 fixed aperture stop
13 lens
14 lens
15, 15' illumination beam path
16 optical axis
17 connecting line
20 beam splitter
30 microscope
31 objective
32 tube optical system
33 imaging optics
34 camera
35 microscope stage
36 object
37 optical axis
40 control unit
50 camera image
51 area
52 intensity profile

What is claimed is:

1. A microscope illumination system comprising:
a first light source configured to provide light along an optical axis; and
an aperture device including an aperture wheel that is rotatable about an axis of rotation, the aperture wheel including a plurality of apertures of varying size disposed circumferentially on the aperture wheel, the aperture wheel being rotatable so as to dispose each of the apertures in a position that is centered on the optical axis so as to generate an illumination beam path that extends in a centered relationship with respect to the optical axis, and so as to dispose each of the apertures in a position that is off-center from the optical axis and within a region around the optical axis defined by a fixed aperture stop disposed centrally with respect to the optical axis and disposed before or after the aperture wheel so as to generate an illumination beam path that extends off-center from the optical axis for oblique incident illumination,
wherein the axis of rotation is disposed parallel to the optical axis so as to form a connecting, line between a first point on the aperture wheel through which the axis of rotation extends and a second point at which the optical axis intersects the aperture wheel, the connecting line being at an angle of substantially 45 degrees from a horizontal.

2. The microscope illumination system as recited in claim 1, wherein the aperture wheel is rotated by a drive motor disposed in an operative position with the aperture wheel.

3. The microscope illumination system as recited in claim 1, wherein the axis of rotation of the aperture wheel is movable in at least one direction that is perpendicular to the optical axis.

4. The microscope illumination system as recited in claim 1, further comprising a fixed aperture stop disposed before or after the aperture wheel in a centered relationship with respect to the optical axis.

5. The microscope illumination system as recited in claim 1, wherein the light source has a spectrum in an ultraviolet wavelength range.

6. The microscope illumination system as recited in claim 1, further comprising a second light source having a different wavelength than the first light source, one of the first and second light sources including at least a part of the ultraviolet wavelength range.

7. The microscope illumination system as recited in claim 6, further comprising a dichromatic beam splitter configured to selectively couple at least one of the first and second light sources into the illumination beam path.

8. The microscope illumination system as recited in claim 6, wherein the first and second light sources include an LED.

9. The microscope illumination system as recited in claim 1, wherein the aperture wheel is disposed in a plane conjugate to the first light source.

10. A microscope comprising:
a microscope illumination system including at least a first light source configured to provide light along an optical axis and an aperture device including an aperture wheel that is rotatable about an axis of rotation, the aperture wheel including a plurality of apertures of varying size disposed circumferentially on the aperture wheel, the aperture wheel being rotatable so as to dispose each of the apertures in a position that is centered on the optical axis so as to generate an illumination beam path that extends in a centered relationship with respect to the optical axis, and so as to dispose each of the apertures in a position that is off center from the optical axis and within a region around the optical axis defined by a fixed aperture stop disposed centrally with respect to the optical axis and disposed before or after the aperture wheel so as to generate an illumination beam path that extends off-center from the optical axis for oblique incident illumination; and
at least one microscope objective,
wherein the axis of rotation is disposed parallel to the optical axis so as to form a connecting between a first point on the aperture wheel through which the axis of rotation extends and a second point at which the optical axis intersects the aperture wheel, the connecting line being at an angle of substantially 45 degrees from a horizontal.

11. The microscope as recited in claim 10, wherein the aperture wheel is disposed in a plane conjugate to an entrance pupil of the microscope objective.

12. The microscope as recited in claim 10, wherein at least a first of the at least one microscope objective is associatable with an aperture of a specific size on the aperture wheel.

13. The microscope as recited in claim 12, wherein the at least one microscope objective includes a plurality of microscope objectives, and at east one of the microscope objectives is associatable with at least one aperture of a specific size on the parture wheel.

14. The microscope as recited in one of claim 10, further comprising a control unit operatively connected to at least one of a drive unit configured to rotate the aperture wheel and to the at least one light source of the microscope illumination system.

15. The microscope as recited in claim 14 further comprising a camera configured to produce a microscopic image of an object in the form of a camera image, the control unit being operatively connected to the camera and configured to analyze the camera image.

16. The microscope as recited in claim 15, wherein the control unit is configured to provide a light source having a spectrum in the ultraviolet wavelength range in the illumination beam path, and to reproducibly adjust a user-selectable aperture to one or more defined positions relative to the optical axis using the drive unit of the aperture wheel.

17. The microscope as recited in claim 14, wherein the control unit is configured so as to optimize the camera image with respect to at least one of resolution and contrast by controlling at least one of the at least one light source and the drive unit, the drive unit being configured to insert a selected aperture into the illumination beam path and reproducibly adjust the aperture to defined positions relative to the optical axis.

18. The microscope as recited in claim 17, wherein the control unit is configured so as to optimize the camera image with respect to at least one of resolution and contrast in accordance with at least one of a selection of camera images and entry of criteria by a user.

19. The microscope as recited in claim 17, wherein the control unit is configured so as to optimize the camera image with respect to at least one of resolution and contrast using an image-analyzing device.

20. A method for oblique incident illumination of objects for microscopic examination, the method comprising:
providing a microscope illumination system having an optical axis and an aperture wheel that is rotatable about an axis of rotation, the aperture wheel including a plurality of apertures of different sizes disposed in a circumferential direction on the aperture wheel, the aperture wheel being disposed with respect to the optical axis such that each of the plurality of apertures is positionable, by a first rotation of the aperture wheel, centrally on the optical axis in an initial position, and each aperture is positionable, by a second rotation of the aperture wheel, in a position off-center from the optical axis within a defined region around the optical axis defined by a fixed aperture stop disposed centrally with respect to the optical axis and disposed before or after the aperture wheel; and
generating an illumination beam path that extends off-center of the optical axis by moving a first of the apertures out of the initial position to the off-center position for oblique incident illumination,
wherein the axis of rotation is disposed parallel to the optical axis so as to form a connecting line between a first point on the aperture wheel through which the axis of rotation extends and a second point at which the optical axis intersects the aperture wheel, the connecting line being at an angle of substantially 45 degrees from a horizontal.

21. The method as recited in claim 20, further comprising rotating the aperture wheel using a drive motor that is configured to reproducibly adjust the plurality of apertures to defined positions relative to the optical axis.

22. The method as recited in claim 20, wherein the illumination beam path is generated using a light source having a spectrum in the ultraviolet wavelength range.

23. The method as recited in claim 20, further comprising coupling each of a first light source having a spectrum in the ultraviolet wavelength range and a second light source having a spectrum in the visible wavelength range into a beam path of the microscope illumination system via a dichromatic beam splitter.

24. The method as recited in claim 20, further comprising selecting a microscope objective for examination of an object,
directing the illumination beam through the microscope objective onto the object for examination, and
moving an aperture of the plurality of apertures that is associated with the microscope objective into the initial position.

25. The method as recited in claim 20, further comprising generating a camera image using a camera;
analyzing the camera image with respect to at least one of resolution and contrast; and
optimizing the camera image with respect to the at least one of resolution and contrast by rotating the aperture wheel within the defined region around the optical axis.

26. The method as recited in claim 25, wherein, the optimizing the camera image with respect to at least one of resolution and contrast is performed by a user based on at least one of a selection of camera images and entry of criteria.

27. The method as recited in claim 25, wherein the optimizing the camera image with respect to at least one of resolution and contrast is performed automatically using an image-analyzing device.

28. The method as recited in claim 25, wherein the optimizing of the camera image is performed by capturing various camera images of the same object region using different settings that are changeable on at least one of the microscope and the microscope illumination system, generating an intensity profile for a defined area in each of the camera images, and analyzing and comparing the generated intensity profiles with respect to certain criteria, the criteria including at least one of a number of flanks of an intensity profile and a number of extreme values in an intensity profile.

29. The method as recited in claim 20, further comprising generating a camera image using a camera;
analyzing the camera image with respect to at least one of resolution and contrast; and
optimizing the camera image with respect to the at least one of resolution and contrast by selecting at least one of an aperture of the plurality of apertures and a microscope objective.

30. The method as recited in claim 20, further comprising generating a camera image using a camera;
analyzing the camera image with respect to at least one of resolution and contrast; and
optimizing the camera image with respect to the at least one of resolution and contrast by selecting a light source of the illumination system.

31. The method as recited in claim 20, further comprising providing a light source having a spectrum in an ultraviolet wavelength range in the illumination beam path, and reproducibly adjusting a selectable or predetermined aperture to at least one defined position relative to the optical axis.

* * * * *